US011803862B1

(12) United States Patent
Tuomikoski et al.

(10) Patent No.: US 11,803,862 B1
(45) Date of Patent: Oct. 31, 2023

(54) DIGITAL DEEP DIVE FROM VOICE INTERACTION

(71) Applicant: United Services Automobile Association (USAA), San Antonio, TX (US)

(72) Inventors: David Tuomikoski, San Antonio, TX (US); Hector Jaime Castillo, San Antonio, TX (US); Mudhar Al Ethawy, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/833,384

(22) Filed: Jun. 6, 2022

Related U.S. Application Data

(63) Continuation of application No. 15/888,930, filed on Feb. 5, 2018, now Pat. No. 11,354,675.

(60) Provisional application No. 62/455,311, filed on Feb. 6, 2017.

(51) Int. Cl.
*G06Q 30/016* (2023.01)
*G10L 15/22* (2006.01)
*G06Q 20/08* (2012.01)
*G06Q 40/08* (2012.01)
*G10L 17/00* (2013.01)

(52) U.S. Cl.
CPC ......... *G06Q 30/016* (2013.01); *G06Q 20/085* (2013.01); *G06Q 40/08* (2013.01); *G10L 15/22* (2013.01); *G10L 17/00* (2013.01); *G10L 2015/223* (2013.01)

(58) Field of Classification Search
CPC .... G06Q 30/016; G06Q 20/085; G06Q 40/08; G10L 15/22; G10L 17/00; G10L 2015/223
See application file for complete search history.

(56) References Cited

U.S. PATENT DOCUMENTS

| | | |
|---|---|---|
| 6,523,022 B1 | 2/2003 | Hobbs |
| 9,307,080 B1 | 4/2016 | Fernandez |
| 9,961,120 B2 | 5/2018 | Krishnan |

(Continued)

OTHER PUBLICATIONS

Academy by Pulsate, https://academy.pulsatehq.com/deep-dive-into-deep-links/ (Year: 2016).

(Continued)

*Primary Examiner* — Aryan E Weisenfeld
(74) *Attorney, Agent, or Firm* — Fletcher Yoder, P.C.

(57) ABSTRACT

Systems and methods for voice-initiated transaction transfer are provided. A voice-initiated transaction transfer system includes an interactive voice response service that provides an initial voice-initiated transaction with a user and determines an intended transaction of the voice-initiated transaction. The system also includes an app administration service that receives an indication of the intended transaction from the interactive voice response service and triggers provision of a push notification to at least one app running on at least one electronic device associated with the user. The push notification includes an indication of a deep dive view to be presented on the app. The deep dive view includes a particular transaction screen of the app associated with the intended transaction.

19 Claims, 8 Drawing Sheets

(56) References Cited

U.S. PATENT DOCUMENTS

| | | | |
|---|---|---|---|
| 9,992,334 B2 | 6/2018 | Mauro | |
| 10,055,743 B1 | 8/2018 | Cracchiolo | |
| 10,630,840 B1 | 4/2020 | Karp | |
| 2003/0164855 A1 | 9/2003 | Grant | |
| 2005/0047579 A1 | 3/2005 | Salame | |
| 2009/0013255 A1 | 1/2009 | Yuschik | |
| 2009/0149158 A1 | 6/2009 | Goldfarb | |
| 2011/0286586 A1 | 11/2011 | Saylor | |
| 2012/0030115 A1 | 2/2012 | Peace | |
| 2012/0190333 A1 | 7/2012 | Portman | |
| 2012/0290332 A1 | 11/2012 | Bradshaw | |
| 2013/0191170 A1 | 7/2013 | Jarrett | |
| 2013/0343534 A1 | 12/2013 | Nguyen | |
| 2014/0245143 A1 | 8/2014 | Saint-Marc | |
| 2015/0156061 A1 | 6/2015 | Saxena | |
| 2016/0212265 A1 | 7/2016 | Philonenko | |
| 2017/0262891 A1 | 9/2017 | Green | |
| 2017/0289809 A1 | 10/2017 | Smith | |
| 2017/0293466 A1 | 10/2017 | Bostick | |
| 2018/0146088 A1 | 5/2018 | Moshir | |
| 2018/0352515 A1* | 12/2018 | Luna | G06F 16/9574 |

OTHER PUBLICATIONS

Apple discussions, Mar. 30, 2015 (Year: 2015).

\* cited by examiner

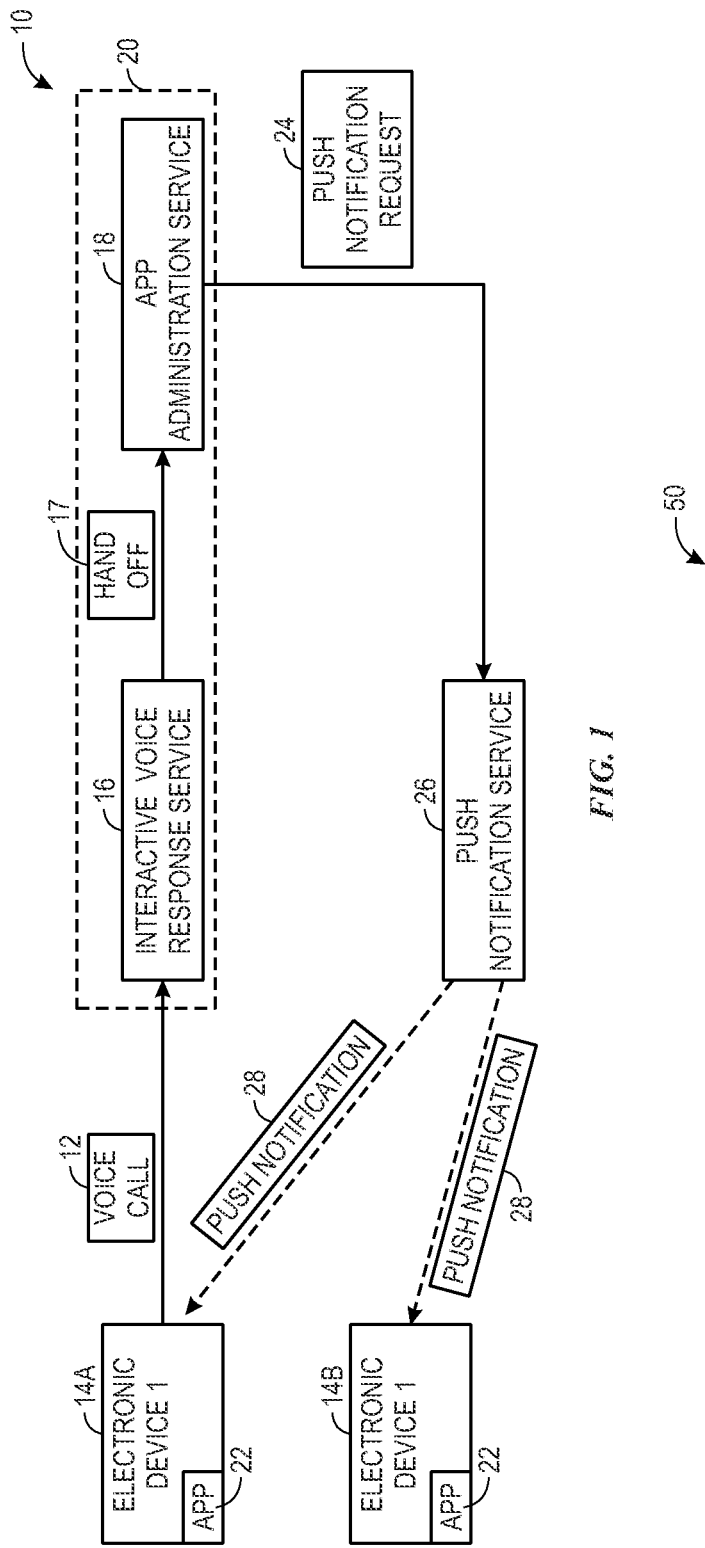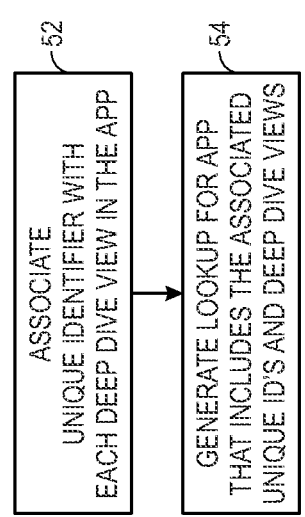

DIGITAL DEEP DIVE FROM VOICE INTERACTION

CROSS REFERENCE TO RELATED APPLICATION

This application claims priority to and benefit from U.S. application Ser. No. 15/888,930, filed Feb. 5, 2018, which claims priority to and benefit from U.S. Provisional Application No. 62/455,311 filed Feb. 6, 2017, and incorporates the entirety of the same by reference herein.

BACKGROUND

The present disclosure relates generally to systems and methods for accessing embedded views of an electronic application or "app" that is initiated from a voice interaction, such as a telephone call. More specifically, the present disclosure relates to facilitating voice-initiated interactions via an automatic switchover to a digital transaction.

Many businesses have traditionally offered telephone customer support representatives ("CSRs") to assist users with completing complex tasks that are difficult to automate via automated voice interactions (e.g., via a telephone). However, CSR interactions can be quite costly and oftentimes may result in increased wait times for customers, as a limited number of CSR resources may be available.

As electronic technology becomes increasingly accessible and powerful, commerce is increasingly conducted electronically online. Modern businesses typically offer access to products, services, and/or transactions via custom applications or "apps" that run on users' electronic devices. These apps have become increasingly sophisticated, offering up numerous features to users. Unfortunately, however, as new features are added, menus and views within these apps may become more complex, resulting in increased difficultly in navigating the apps to find desired features. This may result in users bypassing apps to return to CSR transactions. Accordingly, it is now recognized that improved techniques are desirable for encouraging use of apps to avoid costly CSR transactions by increasing navigability of these apps.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 is a schematic representation of a system for transitioning a voice-initiated transaction to an app transaction, in accordance with an embodiment;

FIG. 2 is a flowchart, illustrating a process for implementing deep dive views for an electronic device application, in accordance with an embodiment;

DETAILED DESCRIPTION OF THE DRAWINGS

Figure 3:
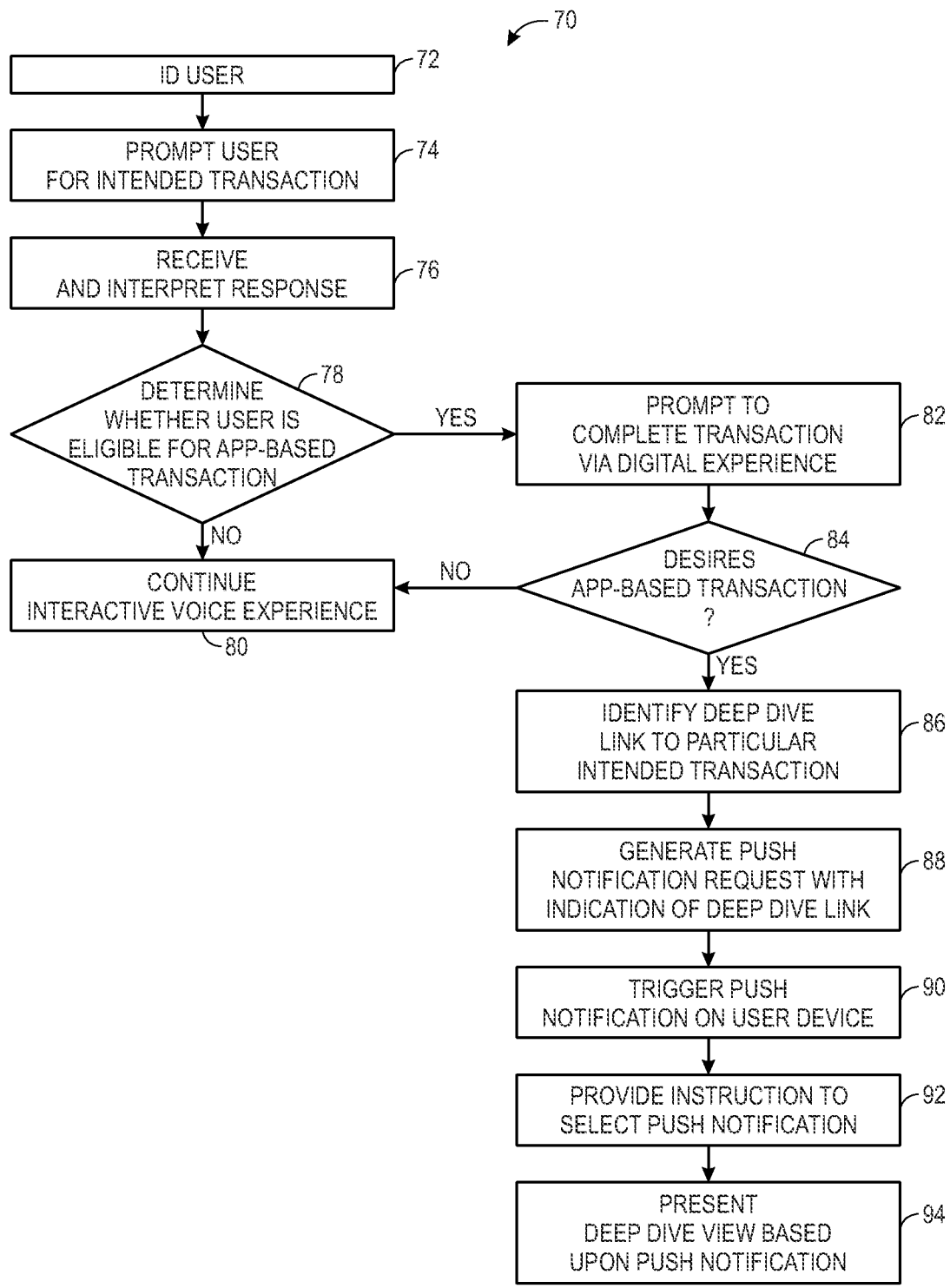
FIG. 3 is a flowchart, illustrating a process for transitioning from a voice-initiated transaction to an app transaction using deep dive views of the app, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward improved systems and methods of transitioning from a voice-initiated transaction to an app-based transaction. Specifically, as will be described in detail below, the techniques discussed herein may transition a transaction to a particular deep dive view of an electronic device app, reducing a user-navigation burden within the app. As used herein, a "deep dive view" refers to a particular transaction screen of an application running on an electronic device. For example, a deep dive view might be a "Transfer Funds" and/or "Debit Dispute" transaction screen for banking transactions on a mobile app. Additional examples might include "Add Coverage", "Add Driver", and/or "Report Claim" transaction screens for insurance transactions in a mobile app, a "Capture Vehicle Identification Number (VIN)" transaction screen for insurance transactions in a mobile app, etc.

More specifically, in accordance with present embodiments, a user and/or user identifier requesting a transaction may be automatically referred to a particular view within numerous sets of views of the electronic device app. This may be completed by providing a push notification regarding the particular view and/or transaction to the electronic device app. The electronic device app may interpret the push notification to present the proper view for the transaction.

Turning first to a discussion of an overall system for transitioning to a deep dive in an electronic device app from a voice-initiated transaction, FIG. 1 is a schematic representation of a system 10 for transitioning from a voice-initiated transaction 12 to an app-based transaction using deep dive views, in accordance with an embodiment. In the embodiment of FIG. 1, the voice-initiated transaction 12 is a voice call originating from Electronic device 14A. For example, a user may call a CSR telephone number via a cellular, digital, or analog telephone. The system 10 may include an interactive voice response service 16, which may interpret the user's voice, providing automated responses to the user, based upon the voice interactions of the user. As will be discussed in more detail below with regard to FIG. 7, the interactive voice response service 16 may, based upon the user's voice interactions, suggest or automatically transition to an electronic device app-based transaction.

For example, the system may provide a hand-off request 17 to an app administration service 18, which may facilitate interactions between the business 20 and instances of the electronic apps 22 installed on electronic devices (e.g., electronic device 14A and/or 14B). The hand-off request 17 may indicate a particular transaction that the user was attempting to complete via the voice-initiated transaction and/or may indicate a particular deep dive view that should be presented to the user based upon the voice-initiated transaction. Additionally, in some embodiments, the hand-off request 17 may include additional parameters, such as a particular one (e.g., electronic device 14A) of a set of devices (electronic devices 14A and 14B) that the deep dive view should be presented on.

As may be appreciated, there may be particular benefits to providing a hand-off of control from the interactive voice response service 16 to the app administration service 18 that is administering the apps 22. For one, the app administration service 18 may have more complete knowledge of the functionality of various revisions of the apps 22 currently active on the electronic devices 14A and/or 14B and, thus, may be better-able to determine particular deep dive view indicators to include in the push notifications 28. For example, the app administration service 18 may be aware that electronic device 14A includes a first revision of app 22 without a transfer funds deep dive view and the electronic device 14B includes a second revision of app 22 with the transfer funds deep dive view. Accordingly, the app administration service 18 may direct a request for a Transfer Funds deep dive view only to app 22 on electronic device 14B.

To facilitate the hand-off request 17, the app administration service may submit a push notification request 24 to a push notification service 26. The push notification request 24 may include an indicator of a particular deep dive view to be presented at the app 22. Further, in some embodiments, when a particular electronic device (e.g., 14A or 14B) is specified as the particular electronic device that should present the deep dive view at the app 22, the push notification request may be directed to the one particular electronic device, rather than broadcasted to all of the user's registered electronic devices.

The push notification service 26 receives the push notification request 24 and determines if the request is permitted by the user (e.g., the user has allowed the app administration service 18 to provide push notifications). If the app administration service 18 has been permitted to send push notifications to the app 22 of the applicable electronic device (e.g., 14A and/or 14B), the push notification service 26 then provides a push notification 28 to the applicable electronic devices 14A and/or 14B. The push notification 28 includes an indication of the deep dive view requested for presentation on the app 22.

The app 22 running on the applicable electronic device (14A and/or 14B) receives the push notification 28. The app 22 analyzes the push notification 28 to determine the requested deep dive view. Upon determining the requested deep dive view, the app 22 then presents the requested deep dive view, resulting in automatic navigation to the relevant view in the app 22 with little to no user interaction needed for navigation.

It may be appreciated that providing the transition via push notifications 28 provides significant benefits over using other messaging means, such as Short Message Service (SMS) messages. For example, other messaging means, such as SMS messages may be more susceptible to malicious attacks, such as man-in-the-middle attacks, where an imposter may source such messages. In contrast, push messaging requests and the notifications themselves may be encrypted, making them less-prone to malicious attack. Further, provision of push messages 28 for particular apps 22 are typically limited by the push notification service 26 to particular sourcing entities (e.g., the app administration service 18 of business 10 for push notifications 28 provided to apps 22). Accordingly, push messaging is less-susceptible to man-in-the-middle attacks, because only a limited number push messaging sources may trigger a push notification 28.

Turning now to details of operation of the system 10, FIG. 2 is a flowchart, illustrating a process 50 for implementing deep dive views for an electronic device application, in accordance with an embodiment. As mentioned above, the app 22 of FIG. 1 interprets indication data from the push notifications 28 to determine which deep dive view to present in the app 22. Accordingly, this indication data may be associated with one of the various deep dive views of the app 22, such that when push notifications 28 are received by the app 22, the app 22 may identify a proper deep dive view to present (block 52). In some embodiments, a unique identifier (e.g., a unique number) may be associated with each deep dive view of the app 22. For example, a "Transfer Funds" deep dive view may be associated with the unique identifier 1, a "Capture VIN number" deep dive view may be associated with the unique identifier 2, etc.

A lookup reference table may be generated using the associated data from block 52 (block 54). For example, during app 22 development and/or updates, a lookup file and/or table may be provided with the app 22, such that the app 22 may look up a particular deep dive view associated with a particular unique identifier provided in a push notification 28.

After the unique identifiers and deep dive views are associated for look up in the app 22, transitioning to app-based transactions may be activated. FIG. 3 is a flowchart, illustrating a process 70 for transitioning from a voice-initiated transaction 12 of FIG. 1 to an app-based transaction using deep dive views of the app 22, in accordance with an embodiment.

In some embodiments, the process 70 may begin by identifying the user that has initiated the voice-initiated transaction 12 (block 72). For example, in some embodiments, caller-ID functionality may be used to identify the user. Additionally and/or alternatively, voice prompts from the interactive voice response service 16 of FIG. 1 may request certain user-identifying information, such as a social security number, name, account number, etc. that may be used to identify the user.

As will be discussed in more detail below with regard to FIG. 7, the interactive voice response service 16 may provide prompts, which may guide the user through the available transactions. For example, while the embodiments described below provide voice-related prompts that allow a user to provide audible feedback to questions, in other embodiments, alternative response inputs may be provided, such as numeric or alpha-numeric inputs from the user's phone.

In one embodiment, the interactive voice response service 16 may prompt the user for the reason they have initiated the voice-initiated transaction (e.g., the intended transaction) (block 74). Upon receiving a response from the user, the response is interpreted to determine the intended transaction (block 76).

Next, the system 10 may determine whether the user is eligible to perform the intended transaction using an app-based transaction (decision block 78). This determination will be described in more detail below with regard to the FIG. 4.

If the user is not eligible for an app-based transaction, the user is not switched to an app-based transaction, but instead continues forward with the interactive voice experience (block 80). For example, the user may continue to receive automated voice prompts and/or may be directed to a customer service representative (CSR) to facilitate the intended transaction.

However, when the user is eligible for an app-based transaction, the system 10 may prompt the user to complete the transaction via an app-based transaction (e.g., a digital experience) (block 82). In some embodiments, transition to an app-based transaction is mandatory, while in other embodiments, the user may indicate whether they desire to transition to an app-based transaction.

In embodiments, where the user may indicate whether they desire to transition to an app-based transaction, the system may determine whether the user desires an app-based transaction (decision block 84). If the user does not desire an app-based transaction, the interactive voice experience may continue (block 80).

Otherwise, when the user does desire an app-based transaction and/or a mandatory switch to an app-based transaction is dictated by the particular embodiment of the system 10, the system 10 may determine a particular deep dive view associated with the intended transaction (block 86). For example, the system 10 may identify the particular unique identifier or other link to the particular deep dive view in the app 22, based upon the interpreted response of block 76.

Based upon the identified deep dive view link from block 86, the system 10 may generate a push notification request with an indication of the deep dive link identified in block 86 (block 88). This may trigger provision of a push notification to the app 22 on the user's electronic device (e.g. 14A and/or 14B) (block 90). In some embodiments, the user may be required to select the received push notification 28 to trigger display of the deep dive view in the app 22. Alternatively, in some embodiments, the deep dive view may be displayed automatically upon receipt of the push notification 28. In embodiments where the user is required to select the received push notification 28, the system 10 may prompt the user (e.g., via the interactive voice response service 16, via a visual and/or haptic notification on the electronic device 10A and/or 10B) to select the push notification 28. Lastly, the deep dive view may be presented based upon the received and/or selected push notification (block 94).

Figure 4:
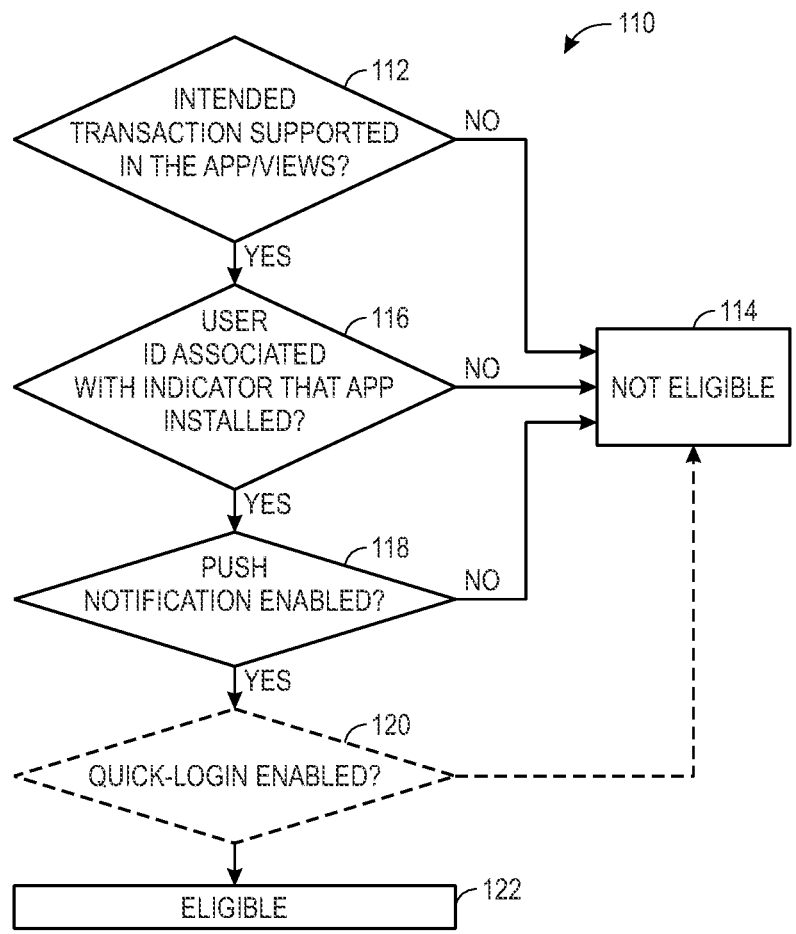
FIG. 4 is a flowchart, illustrating a process for identifying whether a user is eligible for switching to an app transaction, in accordance with an embodiment.

FIG. 4 is a flowchart, illustrating a process 110 for identifying whether a user is eligible for switching to an app-based transaction, in accordance with an embodiment. As mentioned above, the system 10 may determine an intended transaction based upon the voice interaction with the user during the voice-initiated transaction. For example, the user may say "Transfer funds," indicating that the intended transaction is a fund transfer transaction. To determine if the user is eligible for an app-based transaction, the system may determine whether the intended transaction is supported by the app 22 and/or deep dive views of the app 22 (decision block 112). For example, if the intended transaction is a fund transfer and the app 22 does not support a fund transfer, then the system 10 may determine that the user is not eligible for an app-based transaction (block 114). Additionally and/or alternatively, if there is not a deep dive view within the app 22 that is associated with the intended transaction, the deep dive views may not support the intended transaction and, thus, the user may not be eligible for the an app-based transaction (block 114).

However, when the intended transaction is supported by the app 22, additional considerations may be considered. For example, the system 10 may determine whether the user has the app 22 installed on a registered electronic device (e.g., 14A and/or 14B) (decision block 116). In one embodiment, the business 20 or another entity may maintain a list of electronic devices (e.g. 14A and/or 14B) registered to the user. A list of app 22 status for the electronic devices may also be maintained. For example, a status of whether or not the user has installed the app 22 on the electronic devices may be maintained. If the user has not installed the app 22 on any registered electronic devices, the system may determine that the user is not eligible for an app-based transaction, because there is no app 22 to route the transaction to (block 114). However, if the user does have the app installed on an electronic device registered to the user, the user remains eligible, such that other considerations may be considered.

Additionally, the system 10 may determine whether push notifications are enabled for the apps 22 installed on the electronic devices registered to the user (decision block 118). If none of the apps 22 installed on the electronic devices registered to the user have push notifications enabled, the system 10 may determine that the user is not eligible for an app-based transaction, as push notifications triggering presentation of the deep dive views on the apps 22 will not reach the apps 22 (block 114). However, when at least one of the apps 22 installed on the electronic devices registered to the user have push notifications enabled, the user remains eligible for an app-based transaction.

Additionally, if the user has already gone through a lengthy identification and identity validation process during the voice-initiated transaction, the user experience may be reduced if another lengthy identification and identity validation process needs to occur on the app 22. Accordingly, in some embodiments, it may be desired to only provide an app-based transaction when the user has a quick-login mode enabled in the app 22 that enables the user to bypass an additional lengthy identification and identity verification process. In such embodiments, the system 10 may determine that the user is not eligible for an app-based transaction when the quick-login mode is not enabled (block 114). However, when the quick-login mode is enabled, the user may remain eligible for an app-based transaction.

Any number of considerations may be factored into an eligibility for app-based transactions. The process 110 is provided to illustrate certain of these considerations and is not intended to limit the scope of such considerations of eligibility in any way. Once each of the considerations is considered, if the user meets each of the considerations, the system may determine that the user is eligible for an app-based transaction (block 122).

Figure 5:
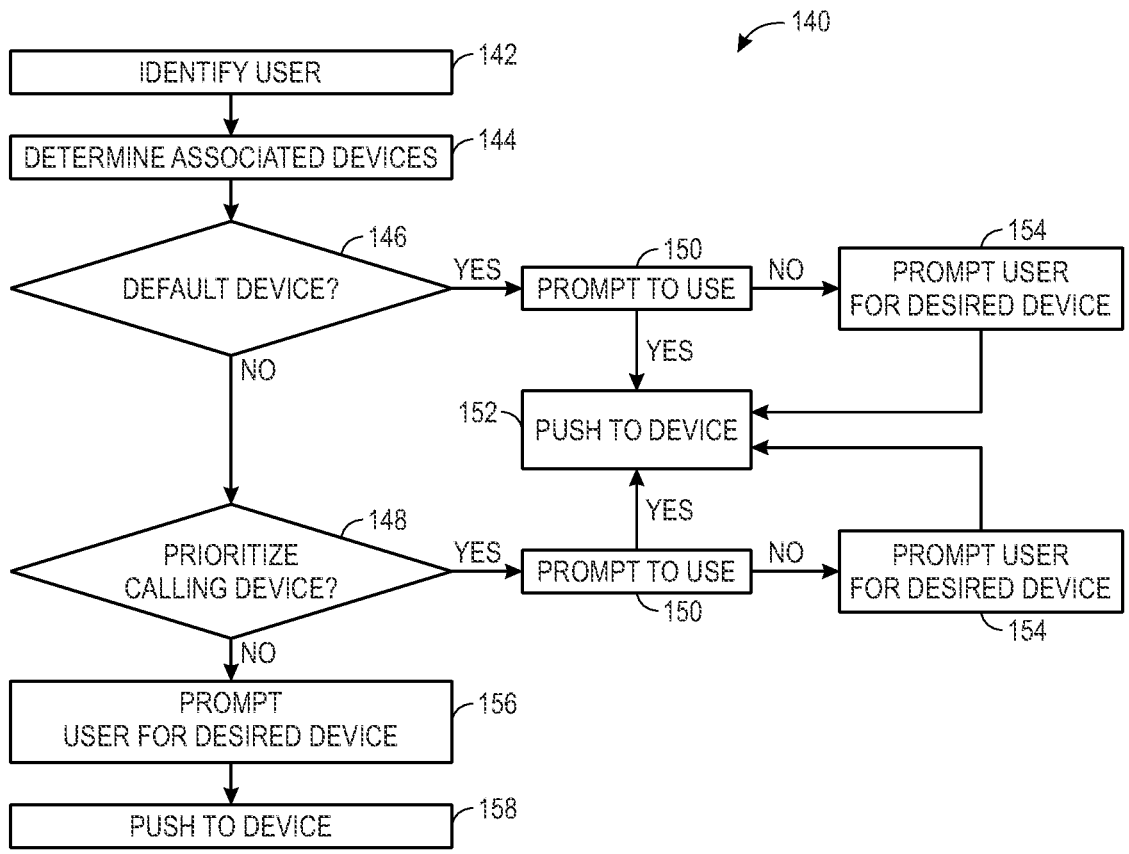
FIG. 5 is a flowchart illustrating a process for identifying and selecting a particular electronic device to transition a voice-initiated transaction to, in accordance with an embodiment.

As mentioned above, the system 10 may broadcast the push notification 28 to all of the user's electronic devices and/or may provide the push notification 28 to a particular one of the user's electronic devices. FIG. 5 is a flowchart illustrating a process 140 for identifying and selecting a particular electronic device (e.g., electronic device 14A and/or 14B of FIG. 1) to transition a voice-initiated transaction to, in accordance with an embodiment. The process 140 begins by identifying the user (block 142). As mentioned above, this may be done using caller-id features, user-identifying voice prompts, etc.

Once the user is identified, the system 10 may determine associated electronic devices that are registered to the user (block 144). For example, as illustrated in FIG. 1, the current two electronic devices 14A and 14B associated/registered to the user.

The system 10 may then determine if there is a default preference of a particular electronic device to use (decision block 146). For example, the user may have previously indicated that all app transactions should occur on a preferred electronic device, such as electronic device 14B.

Additionally and/or alternatively, the system may determine whether or not to prioritize an electronic device that the user used to initiate the voice-initiated transaction (decision block 148). For example, in some embodiments, the electronic device used to initiate the voice-initiated transaction may be the default electronic device or may be otherwise preferred over other electronic devices associated with the user.

If there is a default electronic device and/or the electronic device used to initiate the voice-initiated transaction should be prioritized, the system may prompt the user to use these particular electronic devices (blocks 150). If the user indicates that these devices should be used, the push notification is pushed to respective electronic device (block 152). However, when the user indicates that these particular electronic devices should not be used, the user is prompted to provide an alternative desired electronic device (blocks 154). Upon receipt of an indication of the alternative desired electronic device, the system 10 may push the push notification to the alternative desired electronic device (block 152).

If the system 10 determines that there is no default electronic device and the electronic device used to initiate the voice-initiated transaction need not be prioritized, the system 10 may prompt the user to provide a desired electronic device from the determined associated electronic devices (block 156). Upon receipt of an indication of the desired electronic device, the system 10 may then push the push notification to the desired electronic device (block 158).

Figure 6:
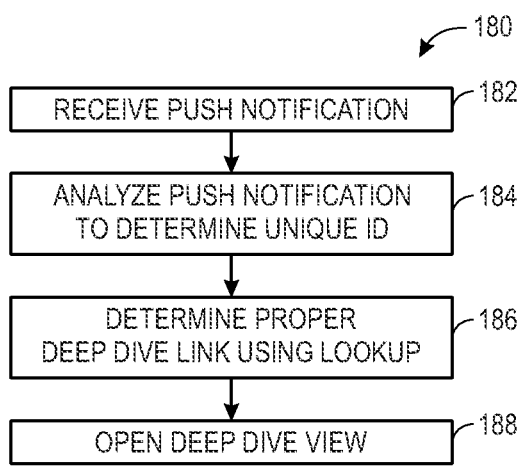
FIG. 6 is a flowchart illustrating a process for presenting deep dive views via an electronic device app, in accordance with an embodiment.

Having now discussed the association of the deep dive views and the identification data of the push notifications and provision of the push notifications to the app 22 of the electronic devices (e.g., 14A and/or 14B), FIG. 6 is a flowchart illustrating a process 180 for presenting deep dive views via an electronic device app 22, in accordance with an embodiment. The process 180 begins by receiving the push notification 28 (e.g., from the push notification service 26 of FIG. 1) (block 182).

As mentioned above, the push notification 28 may include an indicator of a particular deep dive view to be presented by the app 22. For example, the indicator may include a unique identifier associated with a particular deep dive view. Accordingly, upon receipt of the push notification 28, the app 22 may analyze the push notification 28 to obtain the indicator (e.g., determine the unique identifier associated with a particular deep dive view) (block 184).

The app 22 may then determine the particular deep dive view (block 186). For example, as mentioned above, the app 22 may be distributed with a reference lookup file and/or table that associates the indicator with a particular deep dive view. Thus, the indicator may be used to determine the associated particular deep dive view. For example, in one embodiment, the indicator is used as an index to the lookup file and/or table, such that the particular deep dive view is discerned by the app 22.

Once the particular deep dive view is discerned by the app 22, the app 22 may present the deep dive view (block 188). As mentioned above, this may be done with little to no user navigation, which may result in an enhanced user experience with the app 22, encouraging continued use of the app 22 as a substitution for more costly and time-consuming voice-based transactions.

The remaining figures provide an example of the processes described above. The following examples continue to use a transfer funds transaction and provide various dialog examples and example interactions, however these example are not intended to limit the transaction types in any way. Indeed, any number of transaction types and dialog prompts may be implemented using the techniques described herein.

Figure 7:
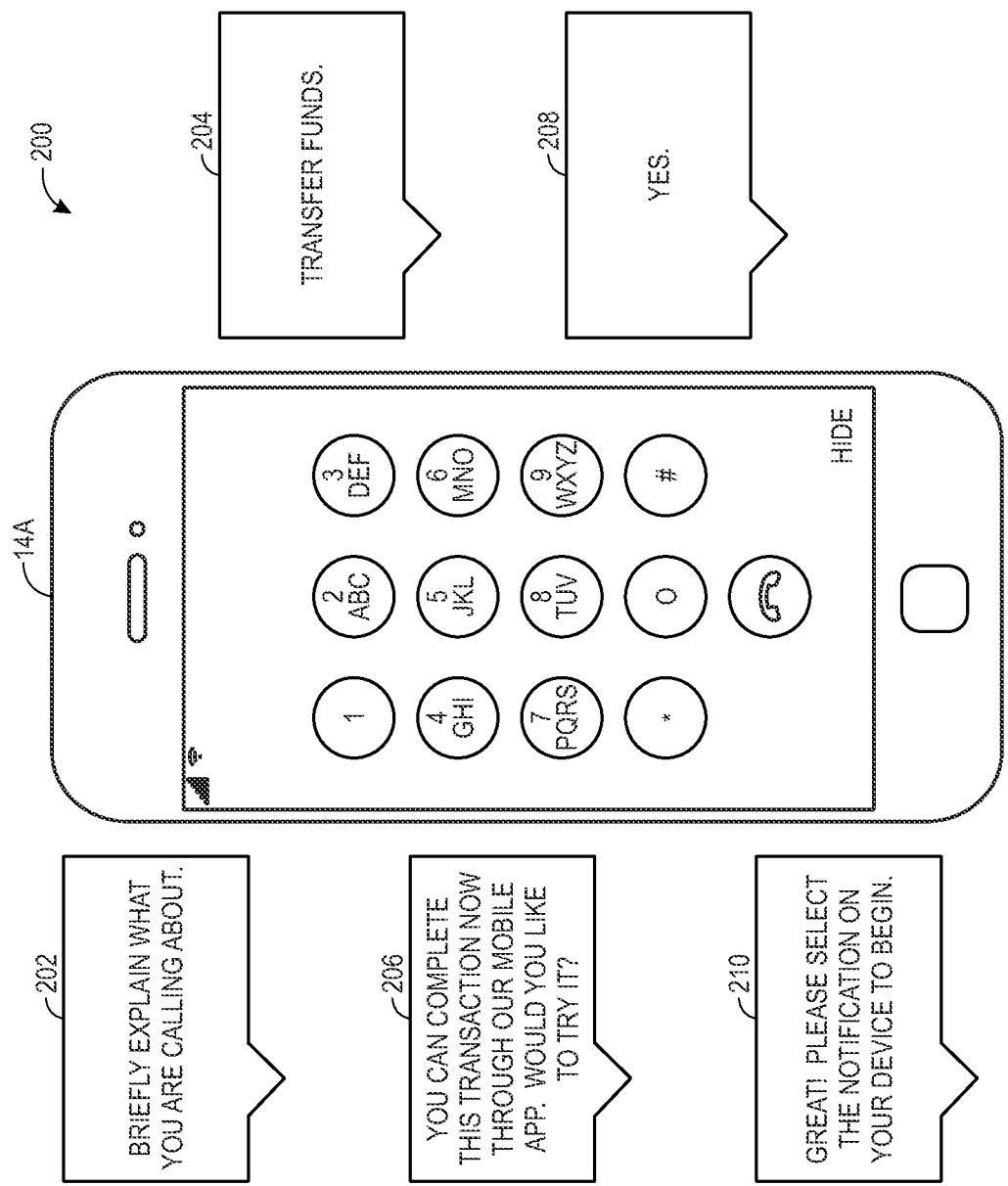
FIG. 7 is a diagram illustrating a progression of interactions leading to transition from a voice-initiated transaction to an app-based transaction, in accordance with an embodiment.

Starting first with FIG. 7, which is a diagram illustrating a progression of voice-interactions on an electronic device 14A leading to transition from a voice-initiated transaction to an app-based transaction, in accordance with an embodiment. The interactive voice response service 16 of FIG. 1, may provide a prompt 202 requesting the user to indicate the intended transaction. For example, in the current embodiment, the interactive voice response service 16 states: "Briefly explain what you are calling about."

The user may provide a response 204, indicating the intended transaction. In the current example, the user states: "Transfer funds."

As mentioned above, the system 10 may interpret the response 204 to determine the intended transaction. Further, the system 10 may determine whether the user is eligible for an app-based transaction. When the user is eligible for an app-based transaction, the interactive voice response service 16 may provide a prompt 206 to use an app-based transaction. In the current example, the interactive voice response service 16 states: "You can complete this transaction now through our mobile app. Would you like to try it?"

The user may provide a response 208 with an indication of whether or not the user desires to use an app-based transaction. In the current example, the user states: "Yes," indicating a desire to use the mobile app (e.g., an app-based transaction).

The interactive voice response service 16 may provide subsequent prompts 210 to complete the transition to the app-based transaction. In the current embodiment, the interactive voice response service states: "Great! Please select the notification on your device to begin."

Figure 8:
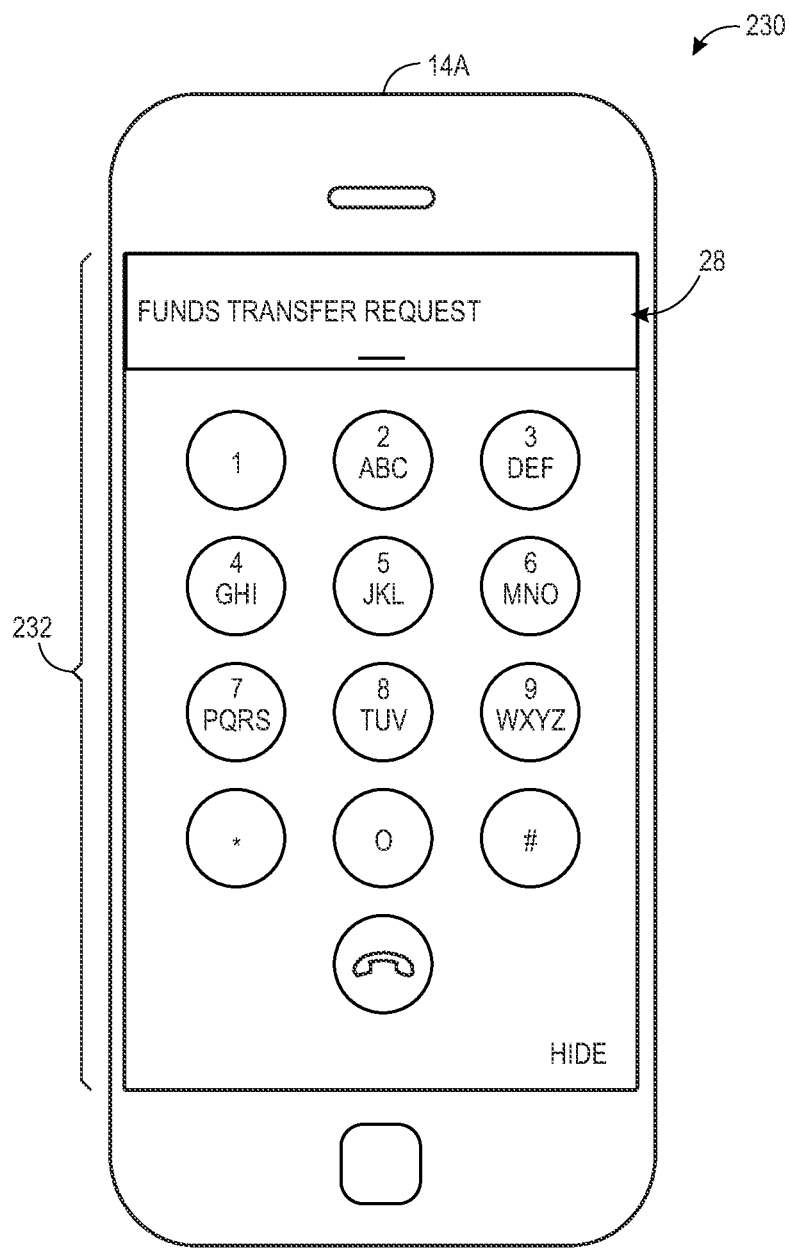
FIG. 8 illustrates a push notification provided via an electronic device app to a user device, in accordance with an embodiment.

As previously mentioned, to transition to the app-based transaction, an app administration service 18 may request that a push notification service 26 provide a push notification 28 to the app 22 on the user's electronic device (e.g., 14A and/or 14B). FIG. 8 is a diagram 230 illustrating a push notification 28 provided to the app 22 of the electronic device 14A, in accordance with an embodiment.

Figure 9:
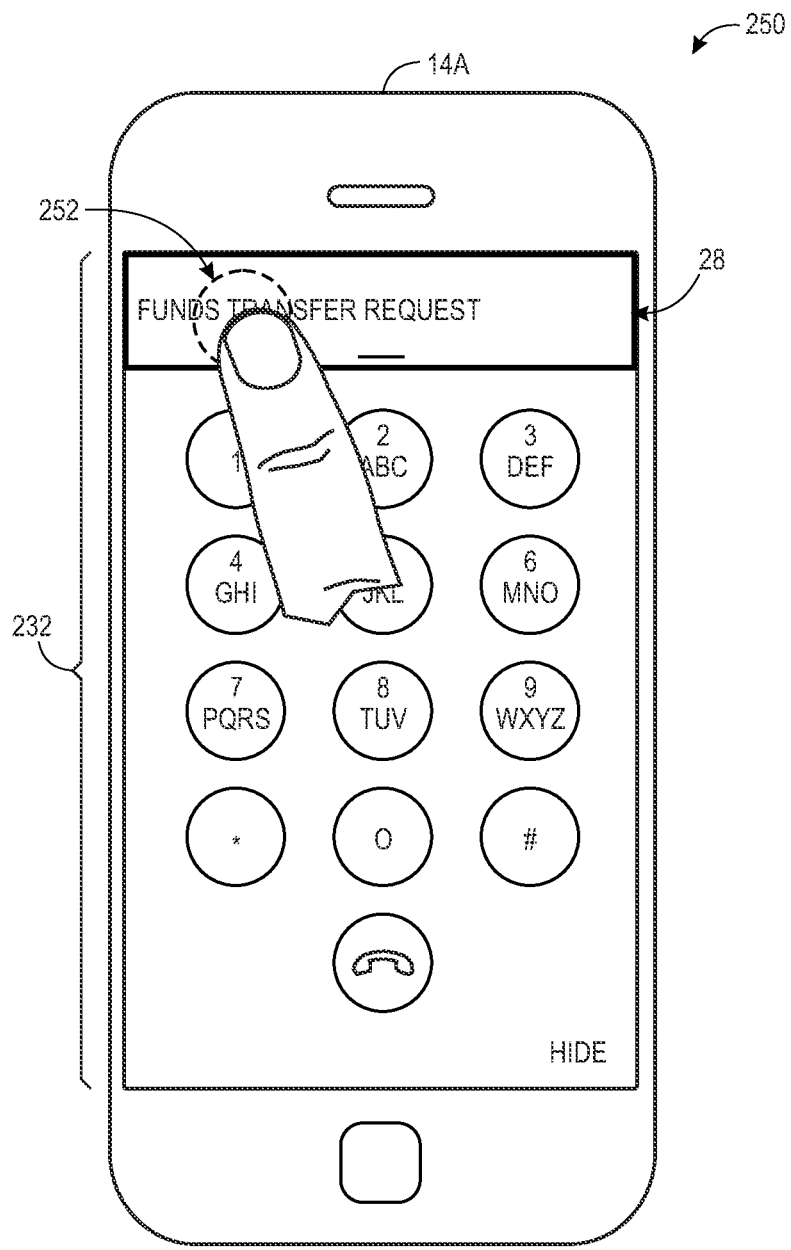
FIG. 9 illustrates a user triggering of navigation to a deep dive view via selection of the push notification of FIG. 8 that is received at the electronic device, in accordance with an embodiment.

As illustrated, the app 22 need not be in the forefront of the graphical user interface (GUI) 232 of the electronic device 14A. In the current embodiment, the push notification 28 is overlaid on top of the GUI 232 presentation, which may be a selectable link to the app 22. FIG. 9 is a diagram 250 illustrating triggering of navigation to a deep dive view via selection 252 of the push notification 28 overlaid on the GUI 232, in accordance with an embodiment.

Figure 10:
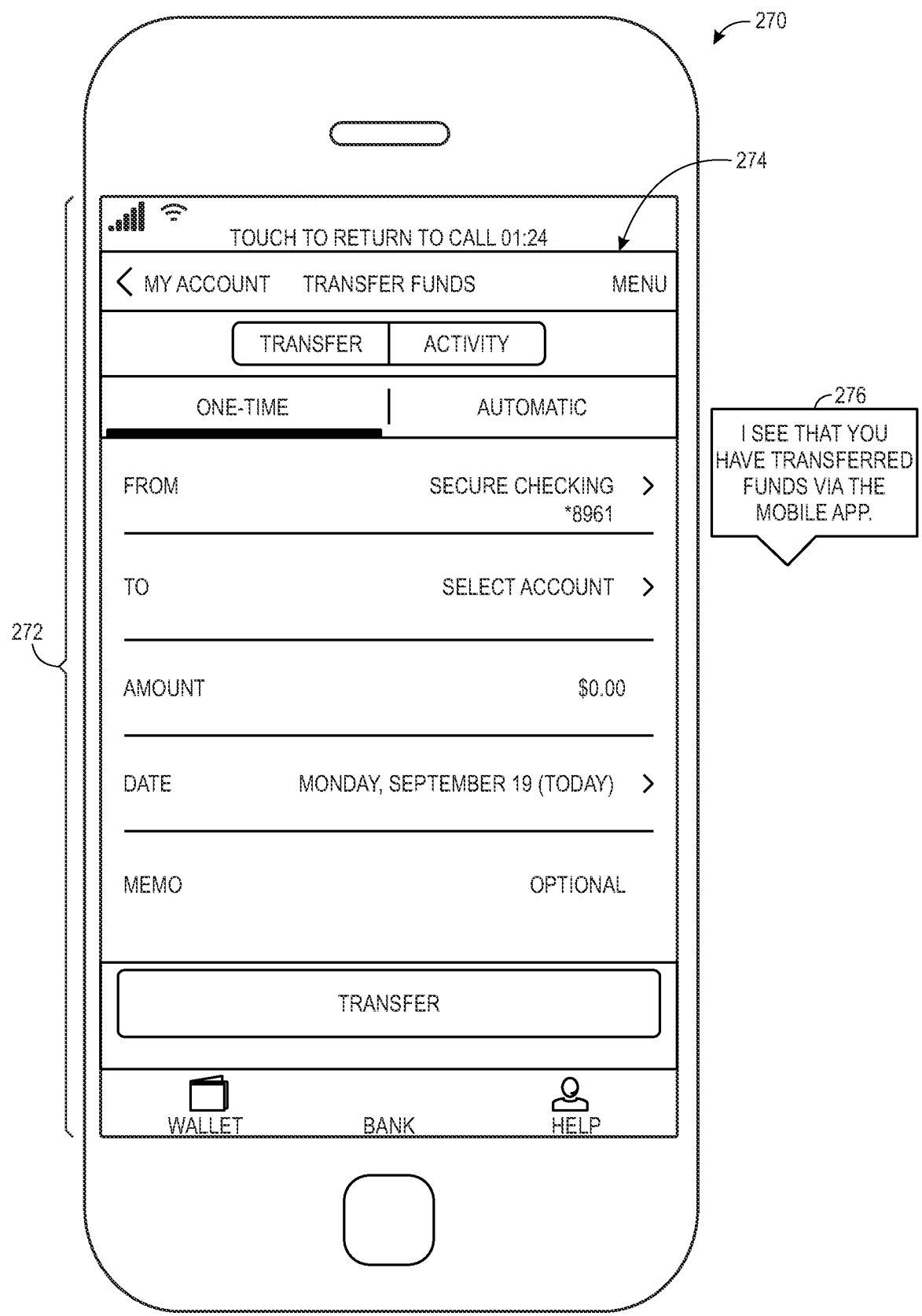
FIG. 10 illustrates provision of a deep dive view of the app on the user device based upon the selection of FIG. 9, in accordance with an embodiment.

Upon selection 252 of the push notification 28, the GUI 232 may transition to the deep dive view of the app 22. FIG. 10 is a diagram 270 illustrating provision of a deep dive view 272 of the app 22 that is presented based upon the selection 252 of the push notification 28 of FIG. 9, in accordance with an embodiment. As illustrated, the deep dive view 272 is correlated with the user's intended transaction derived from prompt 204 of FIG. 7. For example, the current deep dive view 272 illustrated in FIG. 10 is a "Transfer Funds" view as illustrated by the Title Banner 274.

Voice interaction and app-based transactions can be performed in parallel. For example, as discussed above, voice interactions may cause a transition to app-based interactions/transactions. The voice connection may continue, even as app-based interactions are taking place. For example, in the example of FIG. 10, the user may transfer funds via the app-based transaction. Upon performance of an app-based transaction, the voice interaction may provide a confirmation of the transaction. The system providing the voice interaction may monitor for app-based transactions (e.g., app-based transactions related to the deep dive view 272 that the user was transitioned to) and provide a voice interaction prompt, notifying the user that that the system noticed that that the app-based transaction occurred. Here, prompt 276 tells the user "I see that you transferred funds via the mobile app."

This parallel performance of app-based transactions and voice interactions may be particularly useful with data entry tasks where further validation or other tasks will be performed by a customer service representative. For example, enrollment in a service may require enrollment information be provided and confirmation via a customer service representative over the phone. To reduce processing by the customer service representative, which would traditionally input the enrollment information, the current technique may transition the user to an app-based interaction that enables the user to input the enrollment information. The voice system may monitor for submission of the enrollment information. For example, a database may be queried for enrollment data submissions. In some embodiments, only systems associated with a particular context of the transitioned-to app-based interactions may be queried, resulting in processing efficiencies. For example, if the user is transitioned to app-based interactions for inputting enrollment information, the system may restrict polling of data related to enrollment information submission, rather than searching for all data changes associated with the user.

Upon detecting the submission via the app-based interaction, the user may be transitioned back to voice interactions, such that the customer service representative may verify the enrollment information and/or perform other tasks. For example, the voice system may tell the user that "I see that you have submitted your enrollment information. Let me connect you with a customer service representative to complete the enrollment process." The system may then transition the user back to voice interactions with the customer service representative.

As may be appreciated, the current techniques provide an elegant transition from a voice-initiated transaction into an app-based transaction. The user may be guided by the business 10 to a particular deep dive view of an app 22 associated with a transaction the user intended to complete via the voice-initiated transaction, with little to no navigation required by the user. The current techniques encourage a transition from costly voice-based transactions to less-costly app-based transactions, providing awareness of app features in an efficient manner.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A tangible, non-transitory, machine-readable medium, comprising machine-readable instructions that, when executed by one or more processors, cause the one or more processors to:
   conduct a voice-initiated transaction;
   during the voice-initiated transaction, identify a user account associated with a caller of the voice-initiated transaction;
   determine whether the user account is eligible for an application-based transaction based upon whether there is a deep dive view in an application associated with an intended transaction of the voice-initiated transaction;
   in response to determining that the user account is eligible for the application-based transaction:
      identify a plurality of electronic devices associated with the user account;
      determine whether there is a default preference for a particular electronic device of the plurality of electronic devices;
      in response to determining that there is the default preference, send a push notification to an electronic device of the plurality of electronic devices associated with the default preference; and
      in response to determining that there is no default preference:
         determine whether to prioritize an electronic device used to conduct the voice-initiated transaction;
         in response to determining to prioritize the electronic device used to conduct the voice-initiated transaction, send the push notification to the electronic device used to conduct the voice-initiated transaction; and
         in response to determining not to prioritize the electronic device used to conduct the voice-initiated transaction, prompt for a desired electronic device via the voice-initiated transaction and send the push notification to the desired electronic device.

2. The tangible, non-transitory, machine-readable medium of claim 1, wherein the push notification comprises a deep dive identifier associated with a deep dive view to be presented, wherein the deep dive view comprises a particular transaction screen of an application associated with an intended transaction of the voice-initiated transaction.

3. The tangible, non-transitory, machine-readable medium of claim 2, wherein the deep dive view comprises a transaction screen related to an intended transaction comprises adding a driver or other coverage to an insurance policy.

4. The tangible, non-transitory, machine-readable medium of claim 1, wherein identifying the user account comprises using user-identifying voice prompts to identify a user associated with the user account.

5. The tangible, non-transitory, machine-readable medium of claim 1, wherein identifying the user account comprises using caller identification features to identify a user associated with the user account.

6. The tangible, non-transitory, machine-readable medium of claim 1, wherein sending the push notification comprises requesting, via an app administration service, that a push notification service provide a push notification to the particular electronic device or the other particular electronic device.

7. A voice-initiated transaction transfer system, comprising:
   a first electronic device hosting an interactive voice response service configured to:
      provide an initial voice-initiated transaction with a user;
      during the voice-initiated transaction, identify a user account associated with a caller of the voice-initiated transaction;
      determine whether the user account is eligible for an application-based transaction based upon whether there is a deep dive view in an application associated with an intended transaction of the voice-initiated transaction;
      in response to determining that the user account is eligible for the application-based transaction:
         identify a plurality of electronic devices associated with the user account; and
         determine whether there is a default preference for a particular electronic device of the plurality of electronic devices, and send information regarding the default preference for the particular electronic device to an app administration service; and
   a second electronic device hosting the app administration service, the app administration service configured to:
      in response to receiving the information regarding the default preference for the particular electronic device, prompt the caller to use the particular electronic device; and
      in response to receiving an indication from the caller that the particular electronic device is desired, trigger provision of a push notification to the particular electronic device;
      in response to receiving an indication from the caller that the particular electronic device is not desired, prompt the caller for another particular electronic device and trigger provision of the push notification to the other particular electronic device.

8. The voice-initiated transaction transfer system of claim 7, wherein triggering provision of the push notification comprises requesting, via the app administration service, that a push notification service provide a push notification to the particular electronic device or the other particular electronic device.

9. The voice-initiated transaction transfer system of claim 7, wherein the push notification comprises a deep dive identifier associated with a deep dive view to be presented, wherein the deep dive view comprises a particular transaction screen of an application associated with an intended transaction of the voice-initiated transaction.

10. The voice-initiated transaction transfer system of claim 9, wherein the interactive voice response service is configured to determine whether the user account is eligible for an application-based transaction based upon whether the intended transaction is supported in the application associated with the intended transaction of the voice-initiated transaction.

11. The voice-initiated transaction transfer system of claim 9, wherein the interactive voice response service is configured to determine whether the user account is eligible for an application-based transaction based upon whether the application is installed on any electronic device of the plurality of electronic devices associated with the user account.

12. The voice-initiated transaction transfer system of claim 9, wherein the interactive voice response service is configured to determine whether the user is eligible for an application-based transaction based upon whether a quick-login mode for the application is installed on any electronic device of the plurality of electronic devices associated with the user account.

13. The voice-initiated transaction transfer system of claim 9, wherein the app administration service is configured to identify the application from a plurality of possible applications based upon a default electronic device of the plurality of electronic devices associated with the user account.

14. A computer-implemented method, comprising:
   conducting a voice-initiated transaction over a calling device;
   during the voice-initiated transaction, identifying a user account associated with a caller of the voice-initiated transaction;
   determining whether the user account is eligible for an application-based transaction based upon whether there is a deep dive view in an application associated with an intended transaction of the voice-initiated transaction;
   in response to determining that the user account is eligible for the application-based transaction:
      identifying a plurality of electronic devices associated with the user account;
      determining that there is no default preference for a particular electronic device of the plurality of electronic devices;
      in response to determining that there is no default preference for the particular electronic device, determining whether to prioritize the calling device;
      in response to determining to prioritize the calling device, prompting the caller to use the calling device;
      in response to receiving an indication from the caller to use the calling device, sending a push notification to the calling device; and
      in response to receiving an indication from the caller to not use the calling device, prompting the caller for a desired device and sending the push notification to the desired device.

15. The computer-implemented method of claim 14, wherein the push notification comprises a deep dive identifier associated with the deep dive view to be presented, wherein the deep dive view comprises a particular transaction screen of an application associated with an intended transaction of the voice-initiated transaction.

16. The computer-implemented method of claim 14, wherein the deep dive view comprises a transaction screen related to an intended transaction comprising a debit dispute.

17. The computer-implemented method of claim 14, wherein the deep dive view comprises a transaction screen related to an intended transaction comprising reporting an insurance claim.

18. The computer-implemented method of claim 14, wherein the deep dive view comprises a transaction screen related to a transfer of funds.

19. The computer-implemented method of claim 14, wherein the deep dive view comprises a transaction screen related to an intended transaction comprising adding a driver or other coverage to an insurance policy.

\* \* \* \* \*